(12) United States Patent
Hochmuth

(10) Patent No.: US 10,376,003 B2
(45) Date of Patent: Aug. 13, 2019

(54) GLOVE, IN PARTICULAR GOALKEEPER GLOVE, MATERIAL FOR A GLOVE, AND METHOD FOR PRODUCING A GLOVE

(71) Applicant: Peter Hochmuth, Treuchtlingen (DE)

(72) Inventor: Peter Hochmuth, Treuchtlingen (DE)

( * ) Notice: Subject to any disclaimer, the term of this patent is extended or adjusted under 35 U.S.C. 154(b) by 334 days.

(21) Appl. No.: 15/188,686

(22) Filed: Jun. 21, 2016

(65) Prior Publication Data

US 2016/0366958 A1 Dec. 22, 2016

(30) Foreign Application Priority Data

Jun. 22, 2015 (DE) .................... 10 2015 109 959

(51) Int. Cl.
*A41D 19/00* (2006.01)
*A63B 71/14* (2006.01)
(Continued)

(52) U.S. Cl.
CPC ..... *A41D 19/0006* (2013.01); *A41D 19/0048* (2013.01); *A41D 19/0082* (2013.01);
(Continued)

(58) Field of Classification Search
CPC ............ A41D 19/0048; A41D 19/0082; A41D 19/01523; A41D 31/005; A41D 19/0006; A63B 71/141; A63B 71/148; B32B 3/14; B32B 3/263; B32B 3/28; B32B 5/18; B32B 5/245; B32B 5/32; B32B 7/08; B32B 25/042; B32B 27/12
(Continued)

(56) References Cited

U.S. PATENT DOCUMENTS 5,609,431 A 3/1997 Carroll
6,245,401 B1 6/2001 Ying
(Continued)

FOREIGN PATENT DOCUMENTS

DE 8802290 6/1988
DE 9004002 6/1990
(Continued)

OTHER PUBLICATIONS

German Search Report for application No. 102015109959.4 dated Jun. 8, 2016.
(Continued)

*Primary Examiner* — Gloria M Hale
(74) *Attorney, Agent, or Firm* — Workman Nydegger

(57) ABSTRACT

A material for a glove, in particular a goalkeeper glove, comprises a carrier layer, a first material layer and at least one second material layer, wherein the first material layer and the at least one second material layer are applied to the carrier layer alongside one another such that the first material layer and the at least one second material layer immediately adjoin one another in a transition region. Furthermore, a glove, in particular a goalkeeper glove, comprises an inside hand part and an outside hand part, wherein the inside hand part and the outside hand part are joined together by stitching either directly or by way of a gusset arranged between the inside hand part and outside hand part, wherein at least the inside hand part of the glove is produced from such a material.

15 Claims, 6 Drawing Sheets

(51) Int. Cl.
  *B32B 25/04* (2006.01)
  *B32B 3/14* (2006.01)
  *A41D 19/015* (2006.01)
  *B32B 5/18* (2006.01)
  *B32B 5/24* (2006.01)
  *B32B 5/32* (2006.01)
  *B32B 7/08* (2019.01)
  *B32B 27/12* (2006.01)
  *B32B 3/26* (2006.01)
  *B32B 3/28* (2006.01)
  *A41D 31/28* (2019.01)

(52) U.S. Cl.
  CPC ..... *A41D 19/01523* (2013.01); *A41D 31/285* (2019.02); *A63B 71/141* (2013.01); *A63B 71/148* (2013.01); *B32B 3/14* (2013.01); *B32B 3/263* (2013.01); *B32B 3/28* (2013.01); *B32B 5/18* (2013.01); *B32B 5/245* (2013.01); *B32B 5/32* (2013.01); *B32B 7/08* (2013.01); *B32B 25/042* (2013.01); *B32B 27/12* (2013.01); *A63B 2209/10* (2013.01); *A63B 2243/0025* (2013.01); *B32B 2307/402* (2013.01); *B32B 2437/02* (2013.01)

(58) Field of Classification Search
  USPC .......................................... 2/161.1, 159, 160
  See application file for complete search history.

(56) References Cited

U.S. PATENT DOCUMENTS

| | | | |
|---|---|---|---|
| 6,370,693 B1* | 4/2002 | Riccio | A41D 19/01523 |
| | | | 2/160 |
| 2012/0030856 A1* | 2/2012 | Bevier | A41D 19/01582 |
| | | | 2/161.1 |

FOREIGN PATENT DOCUMENTS

| DE | 19641774 | 4/1997 |
|---|---|---|
| DE | 69912094 | 7/2004 |

OTHER PUBLICATIONS

Extended European Search Report for application No. EP16175390 dated Oct. 12, 2016.

* cited by examiner

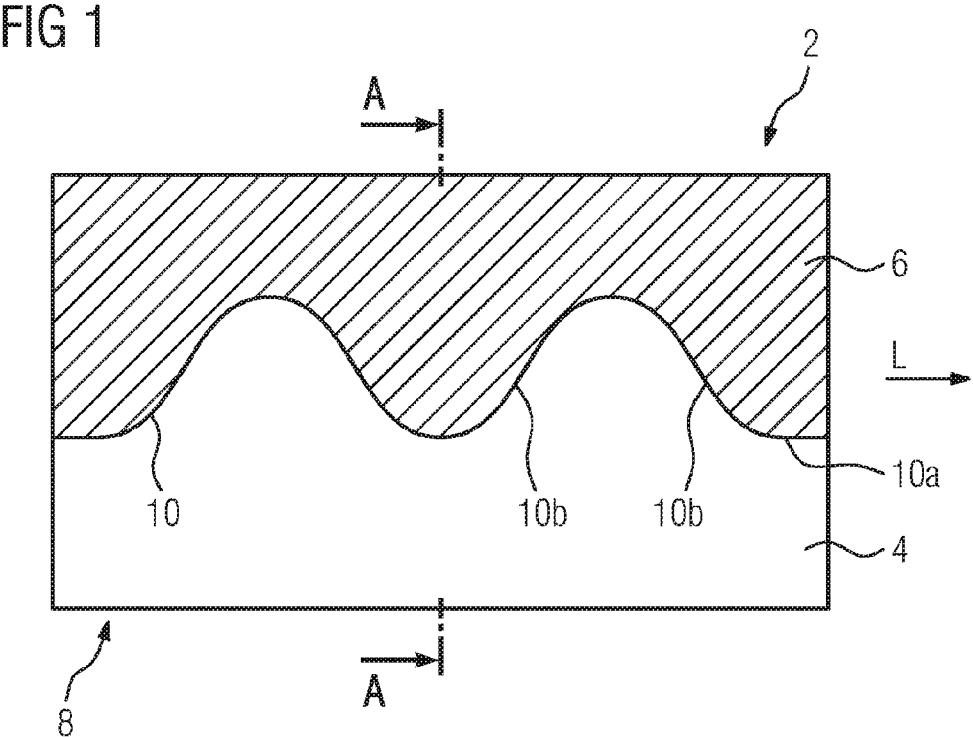
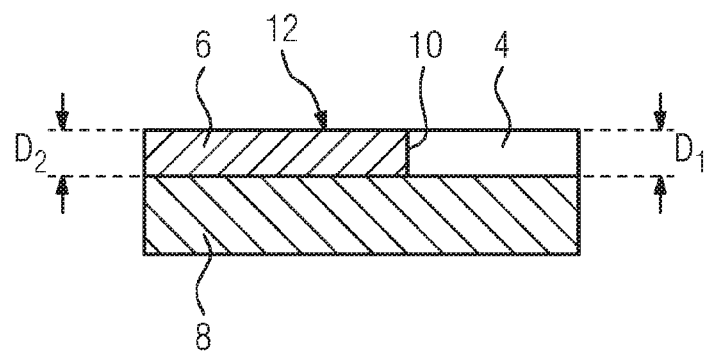

GLOVE, IN PARTICULAR GOALKEEPER GLOVE, MATERIAL FOR A GLOVE, AND METHOD FOR PRODUCING A GLOVE

CROSS-REFERENCE TO RELATED APPLICATIONS

The present invention claims the benefit of priority to German Patent Application No. 10 2015 109 959.4, filed Jun. 22, 2015, entitled "Glove, in particular goalkeeper glove, material for a glove, and method for producing a glove," the entire content of which is incorporated herein by reference.

BACKGROUND OF THE INVENTION

1. The Field of the Invention

The present invention relates to a glove, in particular a goalkeeper glove, having an inside hand part and an outside hand part, wherein the inside hand part and the outside hand part are joined together by stitching either directly or by way of a gusset arranged between the inside hand part and outside hand part. Furthermore, the invention relates to a material for a glove and to a method for producing a glove.

2. Background and Relevant Art

The document DE 36 41 609 C1 discloses a contact foam material for goalkeeper gloves, in which a layer of latex foam is applied to a carrier material and, after partial vulcanization, is provided with depressions into which a second latex foam is poured.

The document DE 299 05 619 U1 describes a sports glove and a multilayer material for a sports glove, in which a plurality of padded parts are applied to a carrier material alongside one another, wherein gaps, furrows or spacings are provided between the padded parts. This serves in particular to make it possible to design the outside hand side of the glove visually with different colors. However, on the inside hand side, a surface having gaps can be disadvantageous, since for example the catching properties can be negatively affected.

BRIEF SUMMARY OF THE INVENTION

It is an object of the present invention to create a material for a glove and a glove, in particular a goalkeeper glove, having improved catching and gripping properties, which also has good wear properties and is as easy to produce as possible. It is likewise an object of the present invention to specify a method for producing such a glove.

The first-mentioned object is achieved by a material according to the features of the claims. The material for a glove, in particular a goalkeeper glove, comprises a carrier layer, a first material layer and at least one second material layer, wherein the first material layer and the at least one second material layer are applied to the carrier layer alongside one another such that the first material layer and the at least one second material layer immediately adjoin one another in a transition region.

The material layers are thus each applied to the carrier layer directly alongside one another and do not overlap one another, or only overlap one another insignificantly, such that a single-layer material layer, consisting of the first and the second material layers, is present on the carrier layer. The application of the first and the second material layers takes place for example by pouring the material layers onto a continuously moving carrier layer. A good join between the first material layer and the second material layer and the carrier layer can be achieved for example by vulcanization. In the transition region, that is to say at a boundary surface between the first and the second material layers, the latter directly adjoin one another and are firmly joined together without intermediate stitching. The first and the second material layers are also joined to the carrier layer without stitching. The lack of such stitching, which can represent a weak point in the material, has the advantage of ensuring a secure join between the material layers. Furthermore, a work step is omitted in the production of the material.

The carrier layer comprises for example a textile material in which a padding material is enclosed between two material webs. Together with the first and second material layers, the carrier layer forms a flexible textile or material web which serves as a starting material for the production of a glove, in particular the inside hand part thereof.

The first and the second material layers of the inside hand part are applied to the carrier layer alongside one another. In this case, the first material layer and the second material layer form a common surface wherein, in a preferred configuration, a thickness of the first material layer and a thickness of the second material layer are constant over the surface. To this end, the application devices that apply the first and second material layers are followed by, for example, a doctor blade or scraper, which produces a smooth, flat surface. It would also be conceivable to cut off a part of the surface, for example by means of a cutting knife, in order to produce first and second material layers with the same height. The first and second material layers consequently form a flat, seamless surface, this being advantageous in particular when used in an inside hand part of a glove, since particular material properties, for example the grip of the glove, are present over the entire inner surface of the hand, since an inside hand part produced from the material does not have any elevations or depressions, let alone gaps.

In a preferred configuration, the transition region between the first material layer and the second material layer has an at least partially curved profile with respect to a longitudinal direction of the carrier layer. The first and the second material layers are thus applied to the carrier layer alongside one another such that the mutually adjoining boundary surface thereof has for example an undulating profile with rectilinear sections optionally located in between. Such a structure of the material is achieved for example in that, during the pouring of the material layers from in each case one application device onto the carrier layer moving in the longitudinal direction, the application devices are moved back and forth transversely to the running direction. This has the advantage that, in the production of an inside hand part of the glove, said part can be produced from the material or the textile web such that desired regions of the inside hand part consist of the first material layer or of the second material layer.

The first material layer and the second material layer are, in particular, each formed from a latex mass. In this case, it is advantageous that for example foamed latex material has good adhesion and cushioning properties.

In one advantageous embodiment, the first material layer and the at least one second material layer differ at least in terms of one material property. In this case, the first and the at least one second material layer differ in particular in terms of their color and/or grip and/or abrasion resistance and/or hardness. This makes it possible to produce a continuous, seamless inside hand part from the material, which can nevertheless be individually adapted in terms of its properties to the different hand regions, that is to say finger regions, thumb region and palm region. In a simplest variant, a visual design of the inside hand part can be achieved in this case by different colors.

The second-mentioned object is achieved by a glove, in particular a goalkeeper glove, according to the features of the claims. The glove, in particular goalkeeper glove, comprises an inside hand part and an outside hand part, wherein the inside hand part and the outside hand part are joined together by stitching either directly or by way of a gusset arranged between the inside hand part and outside hand part. At least the inside hand part is produced from a material having the above-described properties, or from a flexible textile or material web which is formed from the above-described material. The material for the inside hand part is thus formed from a carrier layer, a first material layer and at least one second material layer, wherein the first material layer and the at least one second material layer are applied to the carrier layer alongside one another such that the first material layer and the at least one second material layer immediately adjoin one another in a transition region.

The first and the second material layers are thus joined together directly and without stitching on the common carrier layer, for example made of a textile material. The carrier layer has for example a sandwich structure in which a padding material is enclosed between two material webs, this having the result that the impact on catching a ball is additionally damped. In order to produce the inside hand part, the latter is punched or cut out of the textile web, for example. This has the advantage that the inside hand part is formed integrally and it is not necessary to sew individual regions, for example the finger regions, to the palm region, this having the result that the durability of the glove is increased.

In one preferred configuration, the inside hand part and the outside hand part are joined together by internal stitching by way of a gusset arranged between the inside hand part and outside hand part at least in a lateral index-finger region, in a lateral middle-finger region, in a lateral ring-finger region and in a lateral little-finger region, wherein the inside hand part and the outside hand part are each sewn to the gusset and thus form a finger receiving space. In a front index-finger region, in a front middle-finger region, in a front ring-finger region and in a front little-finger region, that is to say in a region of the fingertips, the inside hand part and the outside hand part can likewise be joined together by internal stitching by way of a gusset arranged in between, or directly. Internal stitching, or negative stitching, should be understood as meaning stitching in which two inwardly folded edges, an edge of the inside hand part and an edge of the outside hand part, have been joined together.

As a result of the gusset, the breathability of the glove is improved and so perspiration is reduced. This results in a better fit of the glove on the hand and in increased wearing comfort.

The inside hand part is joined to the outside hand part preferably by thumb stitching at least in a thumb region, wherein the thumb stitching is configured at least partially as external stitching. External or positive stitching should be understood as meaning stitching in which two outwardly folded edges, an edge of the inside hand part and an edge of the outside hand part, have been joined together. Such external stitching increases the tactile sensitivity and so the object to be gripped can be perceived better in a haptic and/or tactile manner. External stitching is therefore advantageous precisely in the region of the thumb, which plays a decisive role in the gripping of an object, for example of a ball.

In a further preferred embodiment, provision is made for the inside hand part to at least partially overlap the outside hand part in the thumb region, wherein a region of the inside hand part that overlaps the outside hand part is joined to the outside hand part on an outer side of the latter. The inside hand part and the outside hand part are joined in the overlapping region by overlapping stitching, which joins together two overlapping edges. The overlapping region is provided for example on that side of the thumb region that faces the index-finger region, in order to further improve the gripping properties. In addition, thumb stitching which is present in the thumb region facing the index-finger region and is subject to greater loading when the hand is opened, for example when catching a ball, is covered by such an overlap, and the durability thereof is thus increased.

The inside hand part advantageously has a cutout between the thumb region and the index-finger region. In this case, the inside hand part and the outside hand part are each joined to an intermediate layer in a peripheral region of the cutout, said intermediate layer completely covering the cutout. The inside hand part and the outside hand part are thus not joined together directly in this region but via the intermediate layer, such that a sufficiently large finger receiving space for the thumb remains. The intermediate layer is formed for example from a single-layer elastic textile material and overlaps the cutout in its peripheral regions, such that the intermediate layer can be joined, for example sewn or adhesively bonded, to the inside hand part and the outside hand part in order to completely close or cover the cutout. This has the advantage that the glove provides better movability for the thumb when opening and closing the hand, and especially clutching, for example when catching a ball, is rendered easier. The gripping position can be assumed more easily, since the intermediate layer provides less resistance than a continuous inside hand part consisting of a carrier layer and a first and/or second material layer. A more movable thumb is advantageous when throwing the ball, too, since this allows better guidance of the ball.

The inside hand part is preferably produced from the material or from a textile web consisting of the material such that it is formed by the carrier layer and the first material layer applied thereto, at least in a palm region. A thumb region of the inside hand part can likewise be formed at least partially from material comprising the carrier layer and the first material layer.

Furthermore, the inside hand part is preferably produced from the material such that it is formed by the carrier layer and the second material layer applied thereto, at least in the index-finger region, the middle-finger region, the ring-finger region and the little-finger region. In other words: The transition region between the first material layer and the second material layer separates the palm region from the index-finger region, the middle-finger region, the ring-finger region and the little-finger region. The transition region thus extends along the transition of the finger regions into the palm region.

Such a configuration of the inside hand part, or of the regions of the inside hand part that are formed by the first material layer and the second material layer, is achieved in that the inside hand part is punched or cut out of the material with a corresponding shape by positioning the punching tool or cutting tool.

With regard to the method, the object is achieved by a method for producing a glove according to the features of the claims.

In a first step, a first material layer and at least one second material layer are applied jointly to a carrier layer, specifically such that they immediately adjoin one another. A material or a flexible textile web is thus produced which comprises the carrier layer, the first material layer and the at least one second material layer.

In a further step, at least the inside hand part for the glove is produced from, for example punched or cut out of, the material or the textile web. The outside hand part can likewise be produced from such a material.

In a subsequent step, the inside hand part and the outside hand part are joined together by stitching either directly or by way of a gusset arranged between the inside hand part and outside hand part.

The production of the material according to the first step of the method takes place in particular in that the first and the second material layers are applied to the carrier layer simultaneously. In this case, the carrier layer is moved continuously in a longitudinal direction and the respective application devices for the first and the second material layers are moved to and fro in a transverse direction of the carrier layer. As a result, a single-layer material layer can be produced on the carrier layer, wherein the transition region between the first and the second material layers extends along an at least partially curved line. In the production of the inside hand part, the punching tool can for example be positioned such that the first material layer and the second material layer form corresponding regions of the inside hand part.

It is also conceivable, during the application of the first and the second material layers on a carrier layer moving continuously in the longitudinal direction, to employ apertures of some kind in front of the application device, said apertures being opened and closed continuously and contrary to one another in order to create a transition region extending along a curved line. By varying the mass inflow of the first and second material layers, too, it is possible to create an undulating transition region, since the material can spread out differently during pouring.

As an alternative to the simultaneous application of the first and the second material layers, the first and the second material layers can also be applied to the carrier layer in succession. In this case, the first material layer is for example applied first of all to the carrier layer and pre-vulcanized. Subsequently, a part of any desired shape of the first material layer can be removed again, for example using a cutting knife, and the resultant free surface on the carrier layer can be filled with the second material layer.

The finished glove is subsequently provided, for example in a wrist region, with a touch-and-close flap Likewise, for example different design elements or additional protective elements that protect the hand can be applied to the outside hand part and/or the inside hand part.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 shows a plan view of a material for a glove, having a carrier layer, a first material layer and a second material layer;

FIG. 2 shows a material as per FIG. 1 in a sectional illustration on section plane A;

DETAILED DESCRIPTION OF THE PREFERRED EMBODIMENTS

Figure 3:
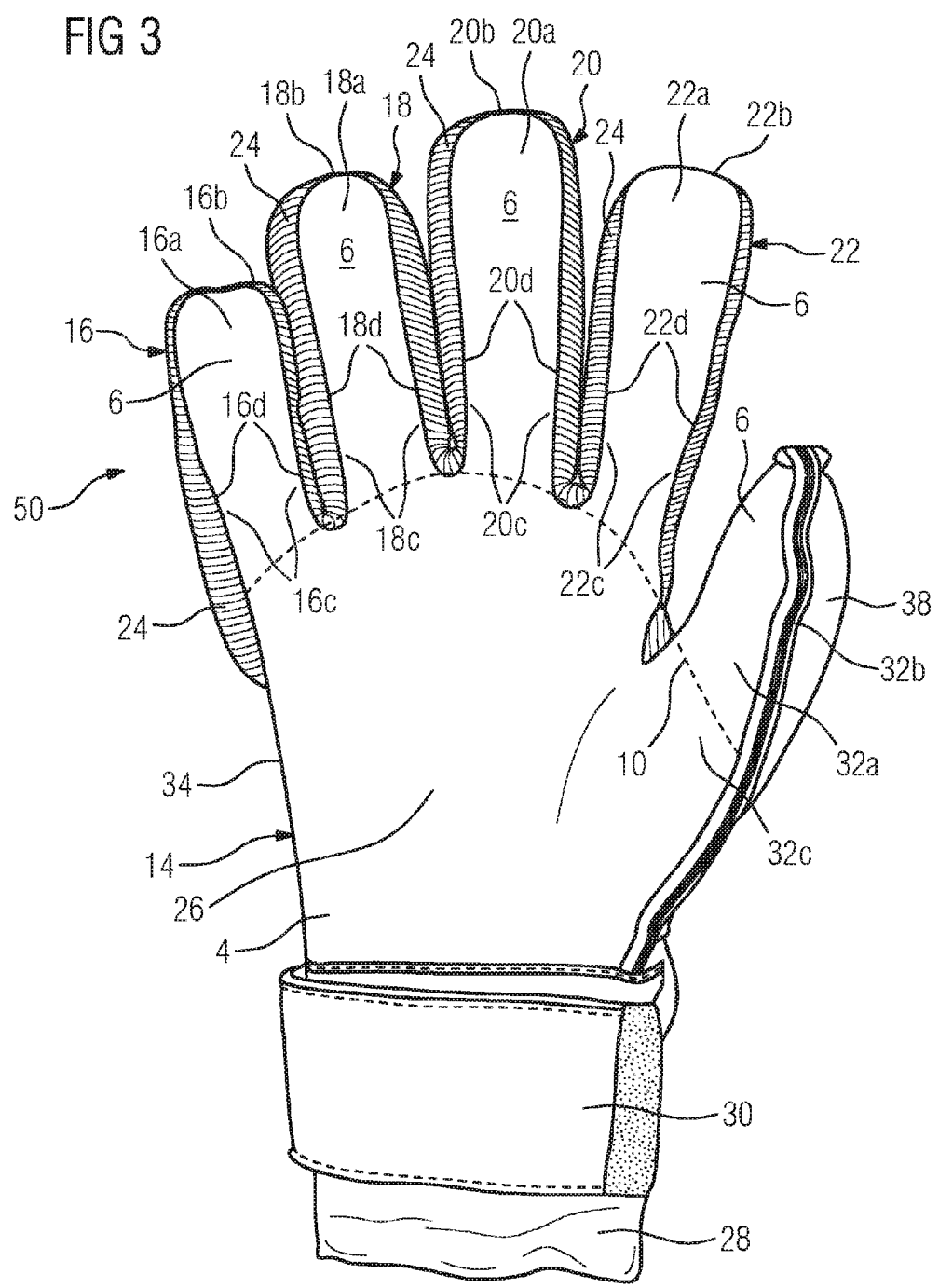
FIG. 3 shows a palm-side view of a glove according to a first embodiment.

FIG. 1 shows a plan view of a material 2 for a glove, said material comprising a carrier layer 8, a first material layer 4 and at least one second material layer 6. The first material layer 4 and the second material layer 6 have been applied over the surface to the carrier layer 8 alongside one another and adjoin one another immediately and seamlessly in a transition region 10, i.e. are each joined together directly and to the carrier layer 8.

The transition region 10 between the first material layer 4 and the second material layer 6 has a partially curved profile with respect to a longitudinal direction L of the carrier layer 8. There are thus regions 10a in which the transition region 10 extends at least virtually parallel to the longitudinal direction L of the carrier layer 8 and regions 10b in which the transition region does not extend parallel to the longitudinal direction L of the carrier layer 8. In other words, the transition region 10 largely has an undulating shape. This has the advantage that an inside hand part produced from the material 2 can be punched out by positioning the punching tool such that the first material layer 4 and the second material layer 6 are present in desired regions of the inside hand part.

FIG. 2 shows a sectional illustration on the section plane A indicated in FIG. 1. The first material layer 4 and the second material layer 6 together form a common surface 12. A thickness D1 of the first material layer 4 and a thickness D2 of the second material layer 6 are constant over the surface 12. To this end, the material layer is smoothed out using a doctor blade after pouring, for example. The first material layer 4 and the second material layer 6 thus form a flat surface 12 which is at the same distance from the carrier layer 8 over the entire material 2.

The first material layer 4 and the second material layer 6 are each formed from a latex mass, but differ in terms of their material properties. The latex material of the first material layer 4 and the latex material of the second material layer 6 have different colors. In addition, they differ with regard to their grip, this being advantageous in particular with regard to the catching properties when used in a glove. For this purpose, for example a contact adhesive is incorporated into the latex material, wherein the content thereof in the first material layer 4 differs from that in the second material layer 6. Furthermore, further material properties of the first material layer 4 and of the second material layer 6, for example the abrasion resistance or the hardness of the material, can be varied by the addition of different quantities of additives.

FIG. 3 illustrates a palm-side view of a glove 50 having a visible inside hand part 14 and a non-visible outside hand part according to a first embodiment. The inside hand part 14 is partially joined directly to the outside hand part, specifically in front regions 16*a*, 18*a*, 20*a*, 22*a* of the little-finger region 16, of the ring-finger region 18, of the middle-finger region 20 and of the index-finger region 22. In other words, the inside hand part 14 and the outside hand part are sewn directly together in a fingertip region in each case by stitching, specifically by front little-finger stitching 16*b*, front ring-finger stitching 18*b*, front middle-finger stitching 20*b* and front index-finger stitching 22*b*, these each being configured as internal stitching.

In a lateral little-finger region 16*c*, in a lateral ring-finger region 18*c*, in a lateral middle-finger region 20*c* and in a lateral index finger region 22*c*, the inside hand part 14 and the outside hand part are joined together via a gusset 24 arranged in between. In this case, the inside hand part 14 and the outside hand part are each sewn to the gusset 24 via lateral little-finger stitching 16*d*, lateral ring-finger stitching 18*d*, the lateral middle-finger stitching 20*d* and the lateral index-finger stitching 22*d*, and form a finger receiving space. The lateral little-finger stitching 16*d*, the lateral ring-finger stitching 18*d*, the lateral middle-finger stitching 20*d* and the lateral index-finger stitching 22*d* are configured as internal stitching and transition into one another between the finger regions 16*c*, 18*c*, 20*c*, 22*c* and a palm region 26. The inside hand part 14 and the outside hand part are thus joined between in each case adjacent fingers via a common gusset 24.

Arranged in a wrist region 28 is a touch-and-close flap 30 which is adjustable to fit individual sizes and thus ensures a secure hold of the glove 50.

The inside hand part 14 consists of a material 2 comprising a first material layer 4 and a second material layer 6 which have been applied to a common carrier layer 8 alongside one another, wherein the carrier layer 8 is arranged at the inside of the glove 50 and therefore not visible. The first material layer 4 and the second material layer 6 form, however, the surface of the inside hand part 14 of the glove 50 that can be seen from the outside. The inside hand part 14 is produced from the material 2, for example punched out of the latter, such that at least the palm region 26 is formed by the carrier layer 8 and the first material layer 4 applied thereto.

In the little-finger region 16, in the ring-finger region 18, in the middle-finger region 20, in the index-finger region 22 and in a front thumb region 32*a*, the inside hand part 14 is formed by the carrier layer 8 and the second material layer 6 applied thereto. A lower thumb region 32*c*, which should be understood as being the region that faces the palm region 26 and transitions into the latter, is formed by the carrier layer 8 and the first material layer 4. The seamless transition region 10 between the first material layer 4 and the second material layer 6—illustrated by a dashed line here—thus extends along the transition of the finger regions 16*c*, 18*c*, 20*c*, 22*c* into the palm region 26 and separates the front thumb region 32*a* from the lower thumb region 32*c*.

Figure 4:
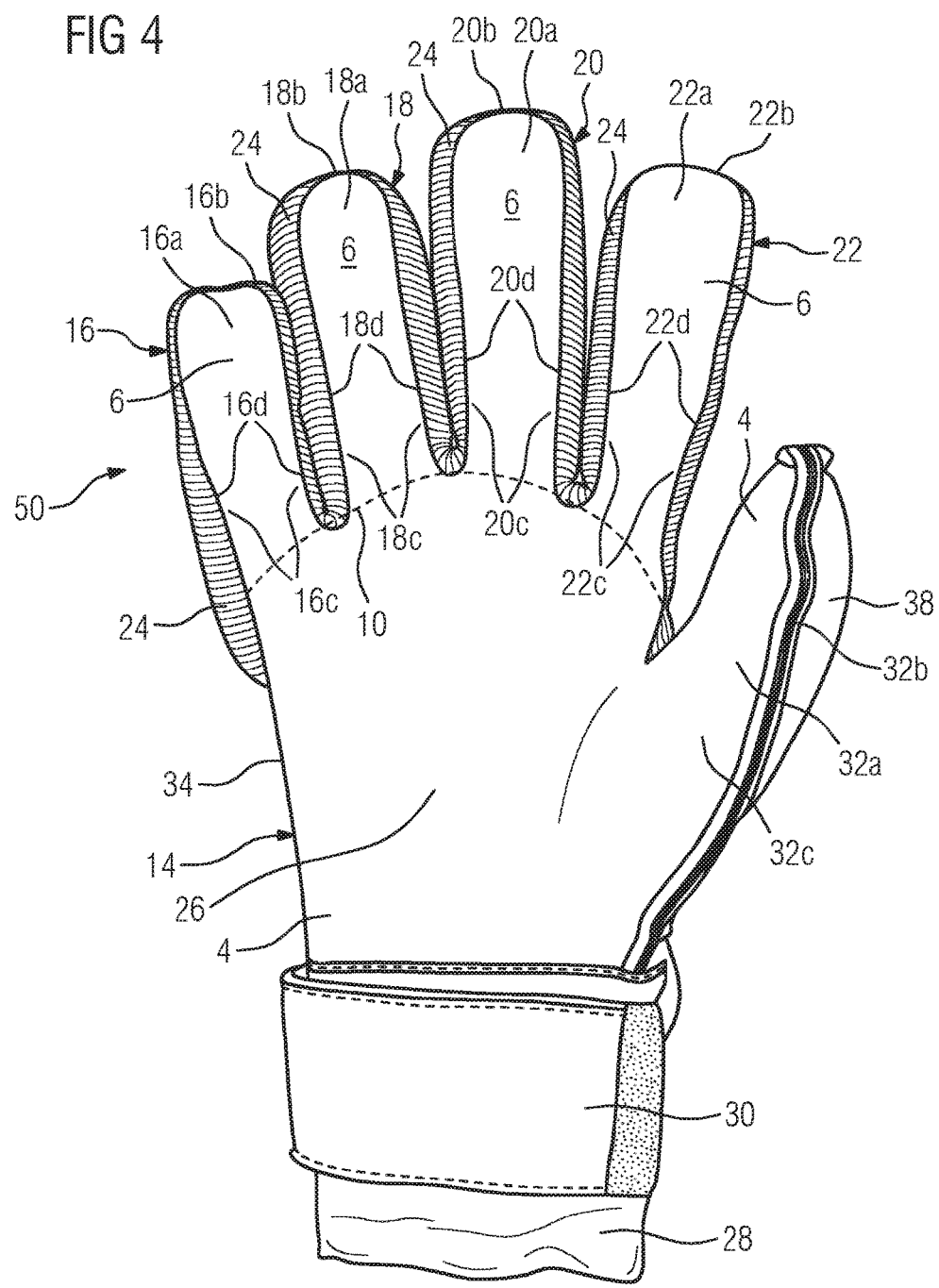
FIG. 4 shows a palm-side view of a glove according to a further embodiment.

FIG. 4 illustrates a palm-side view of a glove 50 having a visible inside hand part 14 and a non-visible outside hand part according to a further embodiment. The inside hand part 14 and the outside hand part of the glove 12 according to FIG. 4 are partially sewn directly together, just as in the glove according to the first embodiment, specifically in a region of the fingertips 16*a*, 18*a*, 20*a*, 22*a*. In lateral finger regions 16*c*, 18*c*, 20*c*, 22*c*, the inside hand part 14 and the outside hand part are each joined together via gussets 24.

In contrast to the first embodiment, the inside hand part 14 is produced from the material 2 such that the entire thumb region 32, i.e. not only the lower thumb region 32*c* but also the front thumb region 32*a* is formed by the carrier layer 8 and the first material layer 4. The inside hand part 14 is thus formed by the carrier layer 8 and the second material layer 6 only in the little-finger region 16, in the ring-finger region 18, in the middle-finger region 20 and in the index-finger region 22. This has the advantage that, for example when a material that exhibits greater damping or greater grip is used as the first material layer 4, the thumb region 32, just like the palm region 26, can be additionally protected when catching a ball, or clutching is rendered easier.

The seamless transition region 10 between the first material layer 4 and the second material layer 6—illustrated by a dashed line here—thus extends only along the transition of the finger regions 16*c*, 18*c*, 20*c*, 22*c* into the palm region 26.

Figure 5:
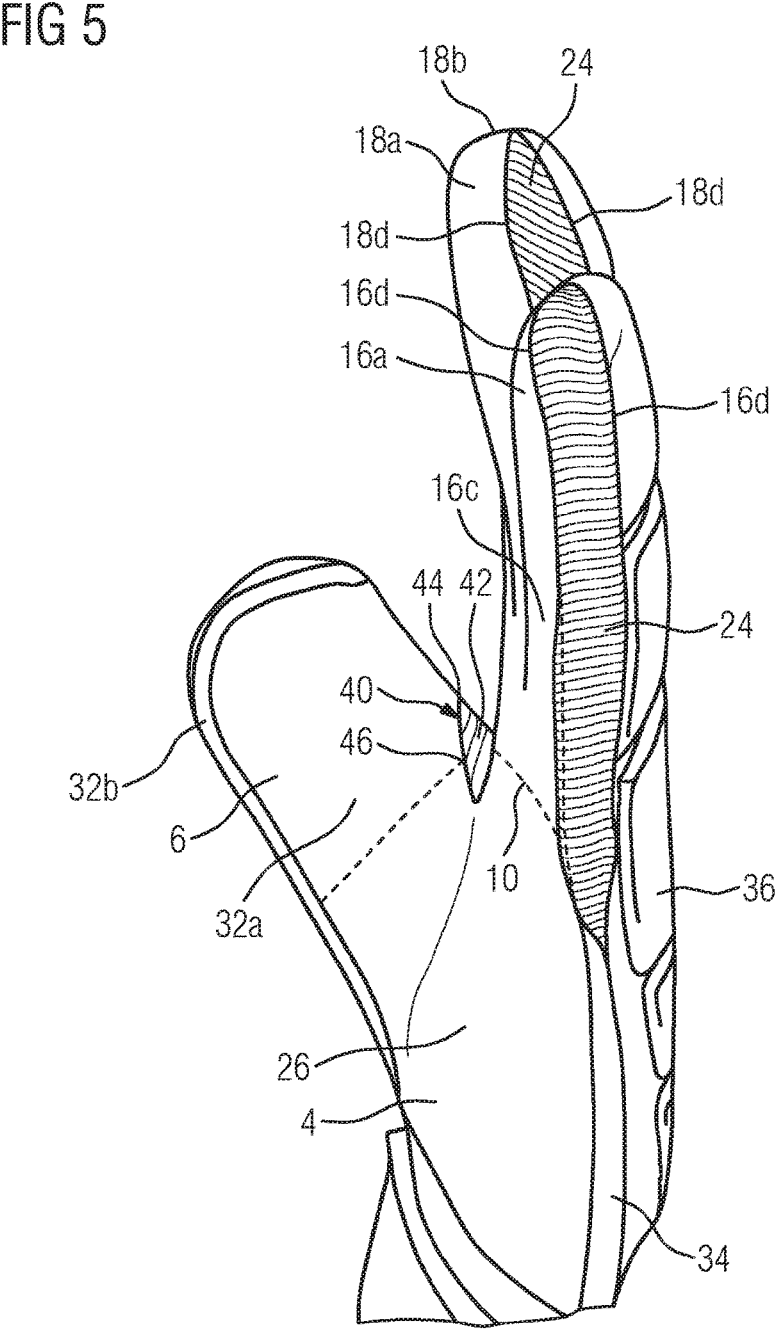
FIG. 5 shows a little-finger-side view of the glove according to FIG.

FIG. 5 shows a little-finger-side view of the glove 50 according to the embodiment in FIG. 3, in which not only the inside hand part 14 but also the outside hand part 36 is visible. In the outwardly facing, lateral little-finger region 16*c*, the lateral little-finger stitching 16*d* transitions into internal hand edge stitching 34.

Between the thumb region 32*c* and the index-finger region 22*c*, the inside hand part 14 has a cutout 40. The inside hand part 14 and the outside hand part are joined via an intermediate layer 42 which is joined to the outside hand part in a peripheral region 44 of the cutout 40 and is joined to the inside hand part 14 in a further peripheral region 46. The intermediate layer 42 thus completely covers the cutout 40 but nevertheless ensures sufficient finger receiving space for receiving the thumb.

The inside hand part 14 and the outside hand part 36 are joined together in a thumb region 32*a*, 32*c* by thumb stitching 32*b*. The thumb stitching 32*b* is formed partially as external stitching 32*b*, specifically in a lateral thumb region and in a region of the thumb tip.

Figure 6:
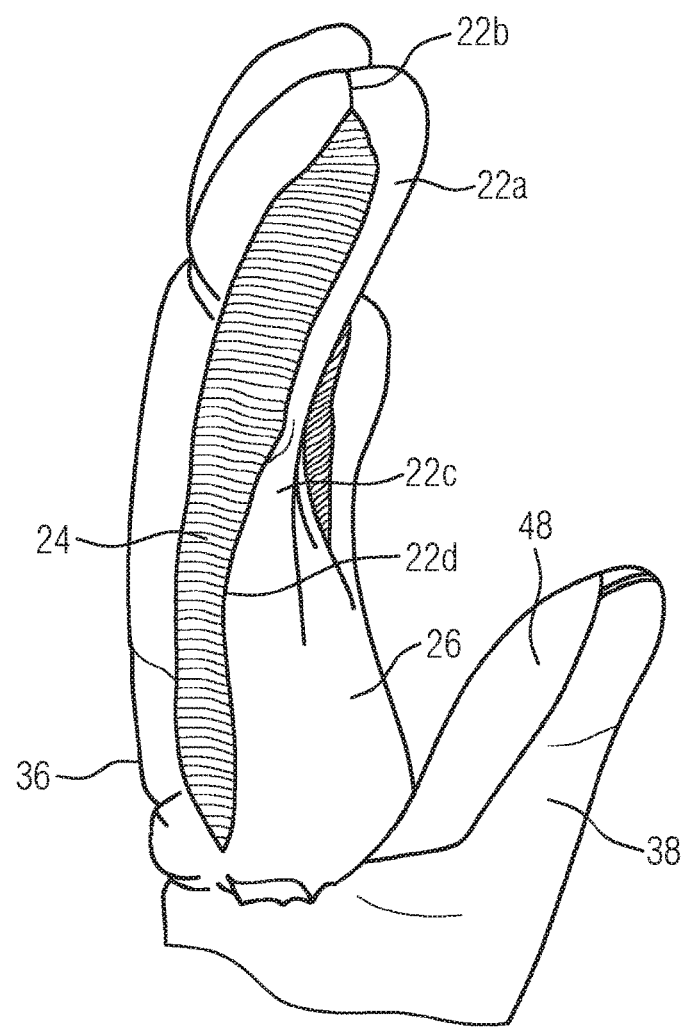
FIG. 6 shows an index-finger-side view of the glove according to FIG. 3.

FIG. 6 shows an index-finger-side view of the glove 50 according to the exemplary embodiment in FIG. 3. The inside hand part 14 at least partially overlaps the outside hand part 36 in the thumb region 32*a* and the overlapping region 48 is joined to the outside hand part 36 on a rear thumb side or on an outer side 38 of said outside hand part 36. That side of the thumb region 32 that faces the index-finger region 22 and stitching arranged there is particularly stressed for example when catching a ball, and so a reinforcement of this region and the avoidance or concealment of stitching at this location is advantageous.

Figure 7:
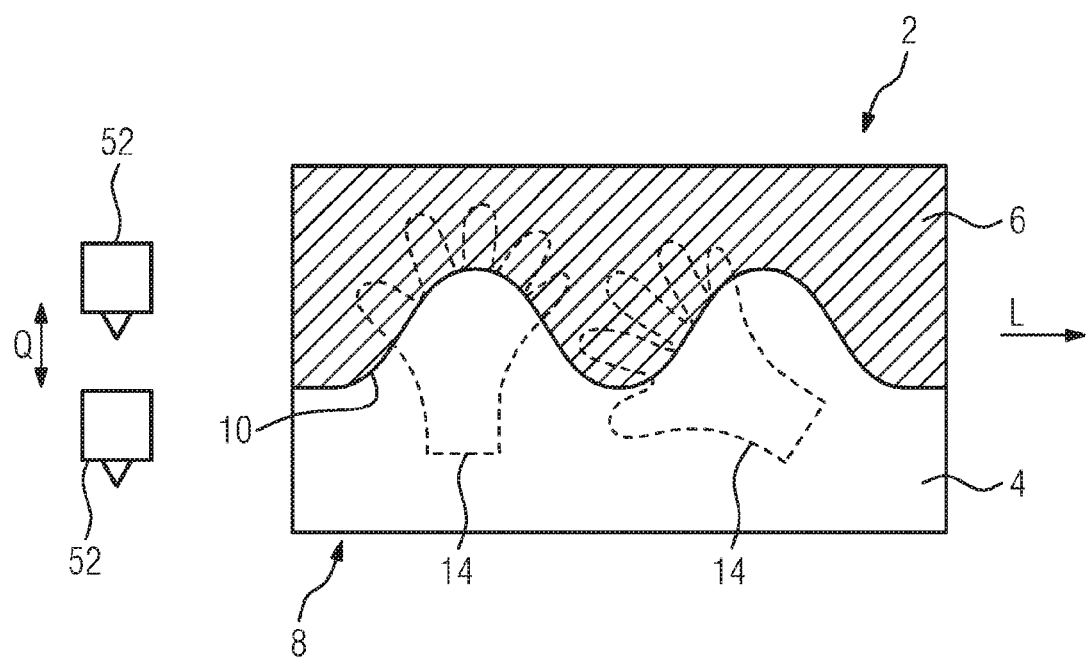
FIG. 7 shows a method for producing an inside hand part of the glove.

FIG. 7 shows a method for producing a glove 50 from the material 2. The first material layer 4 and the second material layer 6 are applied simultaneously to the carrier layer 8 with the aid of application devices 52. For this purpose, the carrier layer 8 is moved continuously in a longitudinal direction L. The application devices 52 are moved intermittently to and fro in the transverse direction Q in order to produce an at least partially curved profile of the transition region 10, i.e. an undulating profile, in the longitudinal direction L. A transition region 10 that extends approximately parallel to the running direction L is achieved when the application devices 52 are not moved in the transverse direction Q.

The distance between the application devices 52 and the quantity of material for the first material layer 4 and for the second material layer 6, which are poured onto the carrier layer 8, are selected such that the first material layer 4 and the second material layer 6 immediately adjoin one another. As a result of a subsequent vulcanization step, the two material layers 4, 6 can additionally be joined firmly together.

In a subsequent step, the inside hand part 14 for a glove is produced from the material 2. For this purpose, for a glove 50 according to the embodiment shown in FIG. 3, a punching tool is positioned on the material such that the finger regions 16, 18, 20, 22 and the thumb region 32a of the inside hand part 14 are punched out of a part of the material where the second material layer 6 has been applied to the carrier layer 8 (illustrated by dashed lines on the left-hand side in FIG. 7). In order to produce an inside hand part 14 as per the glove 50 shown in FIG. 4, the punching tool is rotated further such that only the finger regions 16, 18, 20, 22 are formed by the second material layer 6 applied to the carrier layer 8. The thumb region 32 and the palm region 26 thus consist of the first material layer 4 applied to the carrier layer 8 (illustrated by dashed lines on the right-hand side in FIG. 7). The material 2 thus allows easy production of an inside hand part 14 in which different regions are formed by the desired material layer 4, 6.

In a further step, the inside hand part 14 is sewn to the outside hand part 36 either directly or via a gusset 24 in order to form a glove 50. Finally, a touch-and-close flap 30 for example can be sewn to the wrist region 28, or the inside hand part 14 and/or the outside hand part 36 can be provided with further design elements.

LIST OF REFERENCE SIGNS

- 2 Material/textile web
- 4 First material layer
- 6 Second material layer
- 8 Carrier layer
- 10 Transition region
- 12 Surface
- 14 Inside hand part
- 16 Little-finger region
- 16a Front little-finger region
- 16b Front little-finger stitching
- 16c Lateral little-finger region
- 16d Lateral little-finger stitching
- 18 Ring-finger region
- 18a Front ring-finger region
- 18b Front ring-finger stitching
- 18c Lateral ring-finger region
- 18d Lateral ring-finger stitching
- 20 Middle-finger region
- 20a Front middle-finger region
- 20b Front middle-finger stitching
- 20c Lateral middle-finger region
- 20d Lateral middle-finger stitching
- 22 Index-finger region
- 22a Front index-finger region
- 22b Front index-finger stitching
- 22c Lateral index-finger region
- 22d Lateral index-finger stitching
- 24 Gusset
- 26 Palm region
- 28 Wrist region
- 30 Touch-and-close flap
- 32 Thumb region
- 32a Front thumb region
- 32b Thumb stitching
- 32c Lower thumb region
- 34 Hand edge stitching
- 36 Outside hand part
- 38 Outer side
- 40 Cutout
- 42 Intermediate layer
- 44 Peripheral region
- 46 Peripheral region
- 48 Overlapping region
- 50 Glove
- 52 Application device
- L Longitudinal direction
- Q Transverse direction

I claim:

1. A glove, comprising:
an inside hand part and an outside hand part, the inside hand part being configured to be positioned adjacent a palm of a wearer's hand and the outside hand part being configured to be positioned adjacent to a backside of the wearer's hand;
wherein:
the inside hand part and the outside hand part are joined by stitching either directly together or by way of a gusset arranged between the inside hand part and outside hand part; and
at least the inside hand part is produced from a material comprising a carrier layer, a first material layer, and at least one second material layer,
wherein:
the first material layer and the at least one second material layer are applied to the carrier layer alongside one another;
the first material layer and the at least one second material layer immediately adjoin one another in a transition region; and
the first and the second material layers are each applied to the carrier layer directly alongside one another such that a single-layer material layer is present on the carrier layer.

2. The glove as recited in claim 1, wherein:
the inside hand part and the outside hand part are joined together by internal stitching by way of a gusset arranged between the inside hand part and outside hand part at least in a lateral index-finger region, in a lateral middle-finger region, in a lateral ring-finger region and in a lateral little-finger region; and
the inside hand part and the outside hand part are each sewn to the gusset and thus form a finger receiving space.

3. The glove as recited in either of claims 1, wherein:
the inside hand part and the outside hand part are joined together by thumb stitching at least in a thumb region; and
the thumb stitching is configured at least partially as external stitching.

4. The glove as recited in claim 1, wherein:
the inside hand part at least partially overlaps the outside hand part in the thumb region; and
a region of the inside hand part that overlaps the outside hand part is joined to the outside hand part on an outer side of the latter.

5. The glove as recited in claim 1, wherein:
the inside hand part has a cutout between the thumb region and the index-finger region and an intermediate layer that completely covers the cutout; and
the inside hand part and the outside hand part are each joined to the intermediate layer in a peripheral region of the cutout.

6. The glove as recited in claim 1, wherein the inside hand part is formed by the carrier layer and the first material layer applied thereto, at least in a palm region.

7. The glove as recited in claim 1, wherein the inside hand part is formed by the carrier layer and the second material layer applied thereto, at least in the index-finger region, the middle-finger region, the ring-finger region and the little-finger region.

8. The glove as recited in claim 1, wherein the first material layer and the second material layer form a common surface, wherein a thickness of the first material layer and a thickness of the second material layer are constant over the surface.

9. The glove as recited in claim 1, wherein the transition region between the first material layer and the second material layer has an at least partially curved profile with respect to a longitudinal direction of the carrier layer.

10. The glove as recited in claim 1, wherein the first material layer and the second material layer are each formed from a latex mass.

11. The glove as recited in claim 1, wherein the first material layer and the at least one second material layer differ at least in terms of one material property.

12. The glove as recited in claim 1, wherein the first material layer and the at least one second material layer differ in terms of one or more of their color, grip, abrasion resistance, and hardness.

13. A method for producing a glove, comprising:
applying a first material layer and at least one second material layer to a carrier layer such that they immediately adjoin one another, such that a material comprising the carrier layer, the first material layer and the at least one second material layer is formed,
producing at least one inside hand part of the glove from the material, the inside hand part being configured to be positioned adjacent a palm of a wearer's hand; and
joining the inside hand part and an outside hand part by stitching either directly together or by way of a gusset arranged between the inside hand part and outside hand part the outside hand part being configured to be positioned adjacent to a backside of the wearer's hand.

14. The method as recited in claim 13, further comprising:
applying the first material layer and the second material layer to the carrier layer simultaneously;
wherein the carrier layer is moved continuously in a longitudinal direction and the respective application devices for the first material layer and the second material layer are moved in a transverse direction, wherein the longitudinal direction and the transverse direction as perpendicular to one another.

15. The glove as recited in claim 1, wherein the glove comprises a goalkeeper glove.

* * * * *